Figure 15:
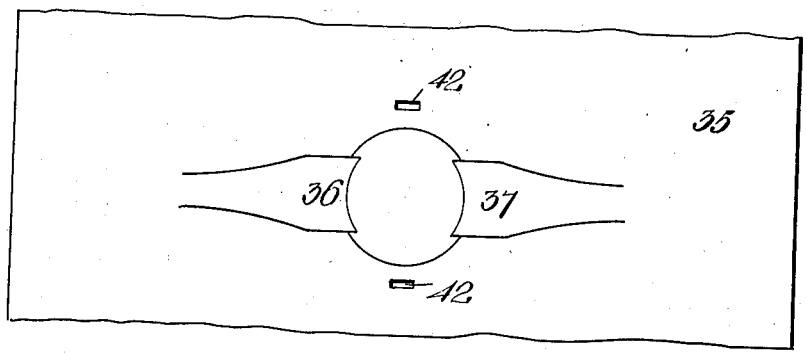

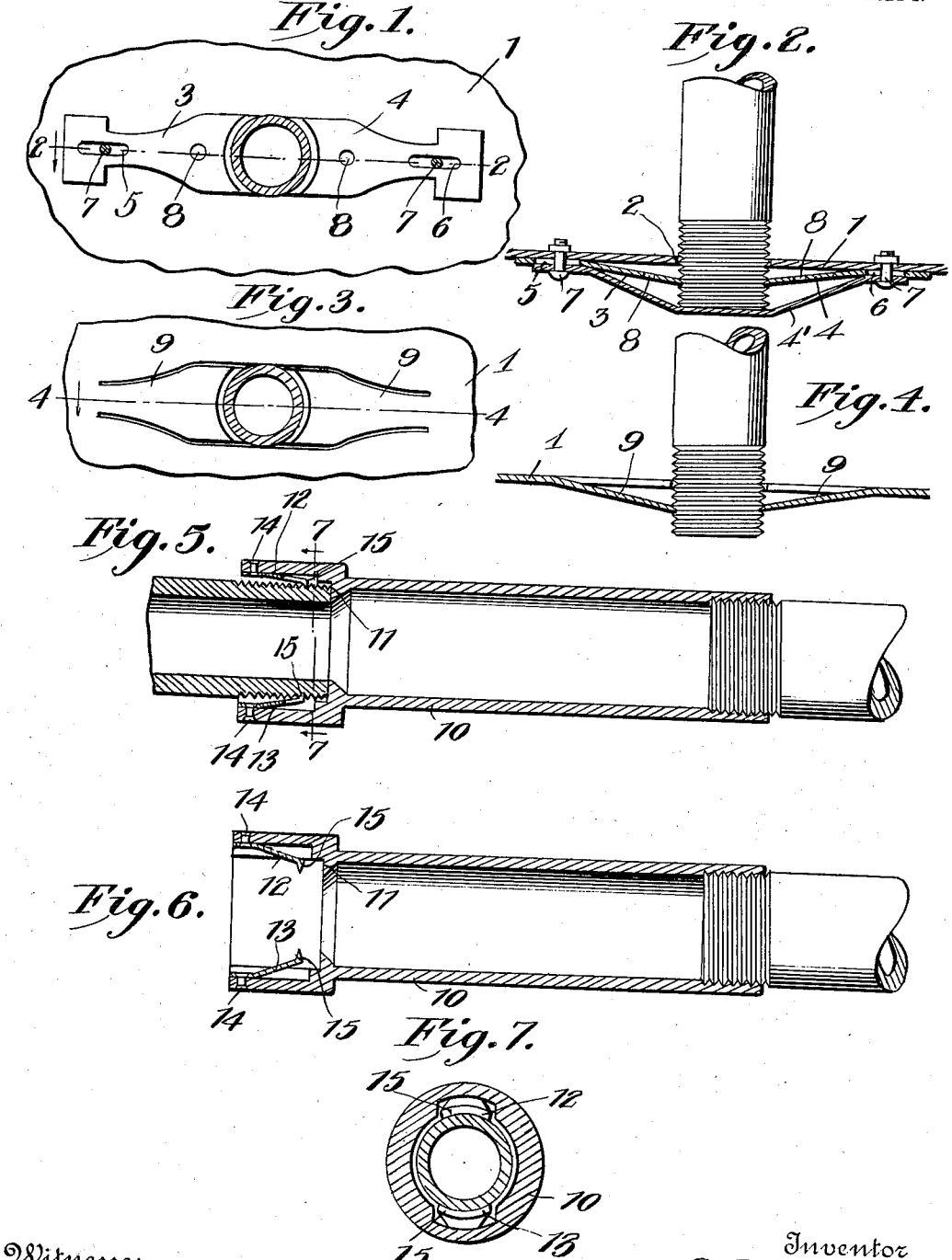

O. M. NEITZEL.
ELECTRIC CONDUIT CONNECTION AND COUPLING.
APPLICATION FILED MAY 3, 1909.
995,893.
Patented June 20, 1911.
3 SHEETS—SHEET 2.
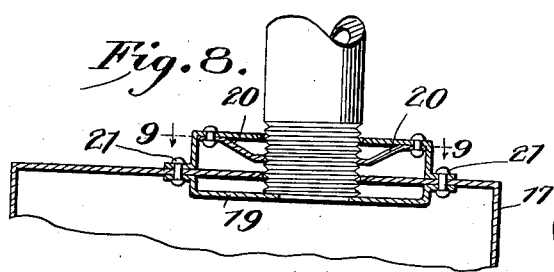
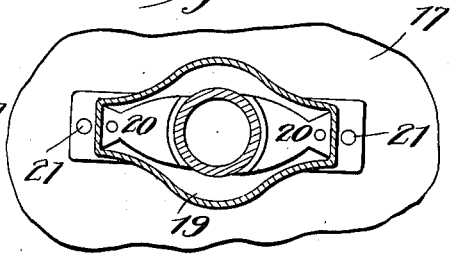
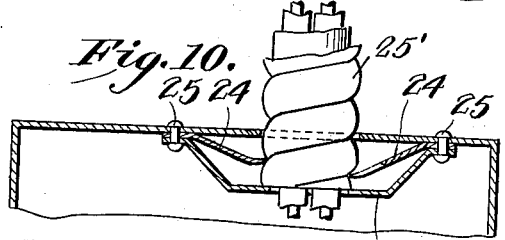
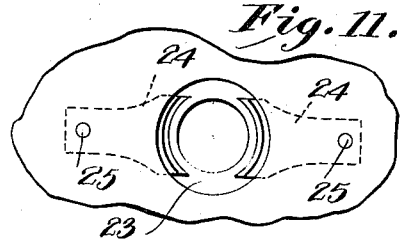
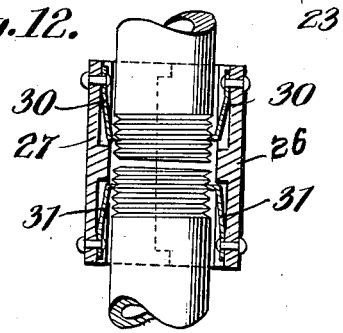
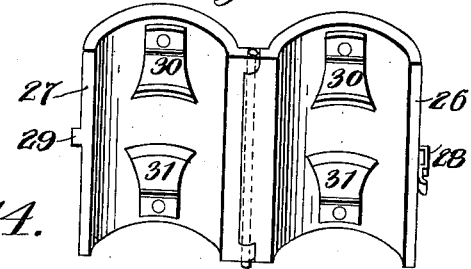
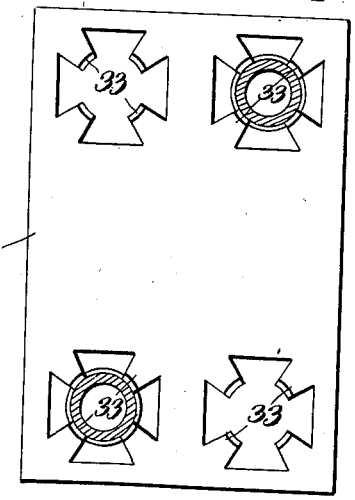
Witnesses
W. H. Rockwell
C. H. Griesbauer
Inventor
O. M. Neitzel
By H. B. Wilson & Co.
Attorneys O. M. NEITZEL.
ELECTRIC CONDUIT CONNECTION AND COUPLING.
APPLICATION FILED MAY 3, 1909.

995,893.

Patented June 20, 1911.

3 SHEETS—SHEET 3.

Witnesses
C. H. Griesbauer

Inventor
O. M. Neitzel
by H. B. Willson &co.
Attorneys

UNITED STATES PATENT OFFICE.

OTTO M. NEITZEL, OF KINGFISHER, OKLAHOMA.

ELECTRIC-CONDUIT CONNECTION AND COUPLING.

995,893.  Specification of Letters Patent.  Patented June 20, 1911.

Application filed May 3, 1909. Serial No. 493,607.

*To all whom it may concern:*

Be it known that I, OTTO M. NEITZEL, a citizen of the United States, residing at Kingfisher, in the county of Kingfisher and State of Oklahoma, have invented certain new and useful Improvements in Electric-Conduit Connections and Couplings; and I do declare the following to be a full, clear, and exact description of the invention, such as will enable others skilled in the art to which it appertains to make and use the same.

This invention relates to improvements in conduit connections and contemplates the construction of a new type of electric outlet boxes or condulets or couplings whereby a connection may be established between the conduit and an outlet box or another conduit by simply inserting the end of a conduit in an outlet box or coupling provided with my improvements.

One of the objects of the invention is the production of simple means for establishing a connection between conduits and outlet boxes by inserting the ends of conduits in openings provided for that purpose in the outlet boxes and which will be so secured when so inserted that the conduits can only be removed by unscrewing the same or by disengaging the securing means independently of the conduits.

Another object of the invention is the production of an outlet box or conduit coupling having a plurality of clutch springs arranged to allow the free insertion of a conduit end in a coupler or outlet box and to prevent the removal of said conduit from the coupler or outlet box when a direct strain or pull is exerted on said conduit.

Another object of the invention is the production of means for establishing a connection between electric conduits and outlet boxes or couplers to be adapted for use in connection with the different styles of outlet boxes or couplers.

A still further object of the invention is the production of conduit securing means comprising a plate of spring metal having a plurality of clutch springs formed or stamped thereon.

A still further object of the invention is the production of conduit connecting means comprising a plurality of clutch springs adapted to be engaged with the ends of conduits and capable of being applied to tubular outlet boxes.

A still further object of the invention is the production of conduit connecting means comprising a plurality of spring clutch arms adapted to engage with the ends of conduits and capable of being adjusted when secured to a tubular outlet box.

With these and other objects in view, the invention consists of certain novel features of construction, combination and arrangements of parts as will be more fully described and particularly pointed out in the appended claims.

Figure 16:
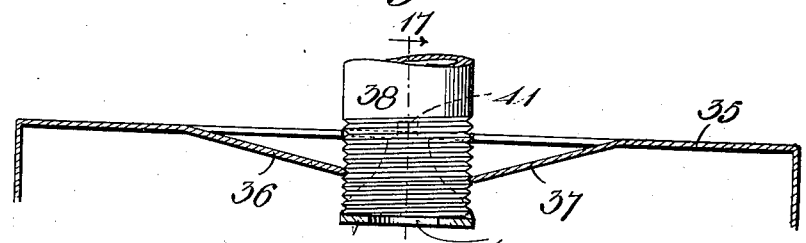
Figure 17:
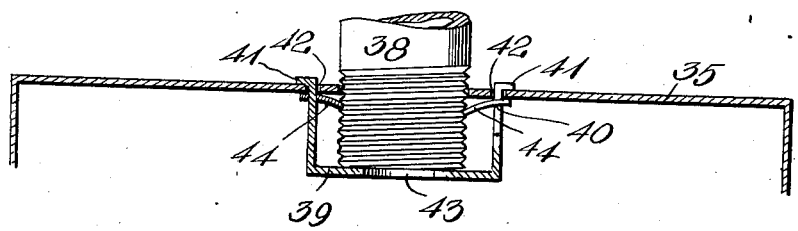
Figure 18:
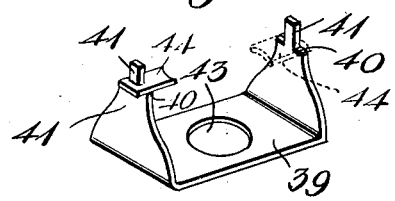

In the accompanying drawings, Figure 1 is a detail plan view of a fragment of an outlet box, showing my invention applied thereto; Fig. 2 is a sectional view showing a limiting plate carried by the box which is omitted from the structure shown in Fig. 1; Fig. 3 is a view of a modification showing the clutch springs formed by stamping the same out of a single plate adapted to serve as the front wall of the outlet box; Fig. 4 is a sectional view taken on line 4—4 of Fig. 3; Fig. 5 is a central longitudinal section of a modification showing a conduit in connected position; Fig. 6 is a similar view showing a conduit disengaged; Fig. 7 is a vertical sectional view taken on line 7—7 of Fig. 5; Fig. 8 is a vertical section of another modification; Fig. 9 is a horizontal section on line 9—9 of Fig. 8; Fig. 10 is a sectional view of a covered conduit having an unthreaded end connected to an outlet box; Fig. 11 is a plan view thereof; Fig. 12 is a central longitudinal section of a coupler arranged to connect two conduits; Fig. 13 is a detail perspective view of a coupler shown in Fig. 12 with the hinged parts thereof shown in an open position and the conduit removed therefrom; Fig. 14 is a view of a rear wall plate of a conduit box with a part of a conduit shown in place thereagainst, the modification shown in this figure being particularly adapted for use in connection with textile covered conduits; Fig. 15 shows a plan view of another modification the stop or bushing being omitted; Fig. 16 is a central longitudinal section of the device shown in Fig. 15 with the stop or bushing in place; Fig. 17 is a section on the line 17—17 of Fig. 16 additional thread-engaging springs being shown; and Fig. 18 is a detail perspective view of the bushing used.

In the accompanying drawings, which are prepared for illustrative purposes, I have described some of the preferred forms of my invention, but the application thereof should not be confined to the modifications and illustrations given.

In Fig. 1, the numeral 1 designates the front wall of an outlet box which is provided with the usual circular opening 2. A plurality of springs 3 and 4 which are formed with longitudinally disposed slots 5 and 6 are secured by means of screws or rivets 7 to the outlet box wall 1. The inner ends of the springs 3 and 4 are formed of a curvature corresponding to the curvature of a conduit and said ends are adapted to stand apart from the adjacent portions of the outlet box wall. A conduit may be inserted in the opening 2 and secured in place to the wall 1 by simply forcing one end of said conduit through the opening and beyond the springs 3 and 4 which are adapted to engage with the conduit end and which springs are secured to the inner side of the conduit wall. After a conduit has been inserted in the opening 2, any attempt to remove the same by pulling directly thereon will be resisted by the springs 3 and 4 which are adapted to lock the conduit end to the outlet box wall and in order to remove the conduit, it will be necessary to unscrew the same in the usual manner, or in the case of conduits having unthreaded ends the springs 3 and 4 are provided with openings 8 which are adapted to receive prongs of a releasing tool which may be inserted in corresponding openings formed in the outlet box wall 1. The wall 1 is also provided with an interiorly projecting bushing or stop plate 4'.

In Fig. 3 and 4, I have illustrated a modification of my invention comprising an outlet box wall formed with gripping springs 9 which are stamped thereon. This arrangement provides for the production of an outlet box at a very low cost and in all other respects its construction is identical with the construction illustrated in Figs. 1 and 2.

In Figs. 5, 6 and 7, I have illustrated another modification of my invention comprising a conduit coupler having a tubular portion 10 which is provided with an internal shoulder 11 and which has secured on its inner periphery a plurality of springs 12 and 13 which are held in place by rivets or screws 14 and which springs are formed with right-angularly bent ends 15, said ends being curved to correspond with the curvature of a conduit end which is adapted to be secured thereto. The conduit is formed with longitudinal recesses to accommodate the springs 12 and 13. When it is desired to secure a conduit to the coupler 10, the end of said conduit is inserted in the end of the coupler and forced beyond the bent ends of the gripping springs and when it is desired to remove the conduit from the coupler, the same may be unscrewed therefrom, due to the fact that the springs are staggered in proportion to the teeth of a die for the corresponding size of pipe, which holds good for both threaded and unthreaded conduit.

In Fig. 8, I have illustrated a modification of my invention comprising the outlet box 17 which is provided with the usual conduit openings around which are secured a plurality of inner stop plates 19 and exteriorly positioned gripping springs 20 which springs and plates are held in place on the outlet box by screws or rivets 21. The operation of the modification illustrated in Figs. 8 and 9 is practically the same as the operation of the modifications previously described.

In Figs. 10 and 11, I have illustrated a still further modification of my invention comprising an outlet box provided with a bushing 23 and gripping springs 24 which are secured exteriorly of the outlet box by rivets or screws 25. A conduit 25' of the steel armored type is secured to the outlet box by means of the springs 24.

In Figs. 12 and 13, I have illustrated a modification of a conduit coupler comprising a coupler formed with a pair of hinged sections 26 and 27. Section 26 is provided with a spring strap 28 arranged on one of its edges and section 27 is provided with a laterally projecting lug 29 arranged on one of its edges and in position to be engaged by the strap 28 when the sections are placed in closed position. Each of the sections 26 and 27 is provided with gripping springs 30 and 31 which have their inner ends bent at right angles to the longitudinal axis of the sections 26 and 27, said springs being secured by means of rivets or equivalent devices to said sections. The springs in these structures are staggered as in that shown in Figs. 5, 6 and 7.

In Fig. 14, I have illustrated a rear wall plate 32 of a conduit outlet box which is formed with a plurality of gripping springs 33 which are arranged to bear at equally spaced points upon a conduit end which may be inserted between said springs. The springs 33 may be stamped on the plate 32 or may be secured by means of rivets or other devices thereto, and may be adapted to clutch or grip a conduit provided with a textile or composition covering and when it is intended that the springs should be used in connection with conduits of this latter type, the springs are so arranged on the wall plate 32 that their ends cannot penetrate beyond the insulation of a conduit with which they are engaged.

In Fig. 15 I have shown a portion of an outlet box 35 which is shown having the tongues or springs 36 and 37 together with the central button partially stamped out so that a few blows with a hammer will displace the button from the springs for engagement with the conduit 38 when placed in position. In the structure shown in Figs. 16 and 17 this type of juncture is shown in connection with a conduit. I preferably use a retaining or limiting member 39 which is provided with a tongue 41 defining the shoulders 40 on either side thereof which are adapted to engage the inner side of the box 35 when the tongues are passed through the slots 42 formed in the box on either side of the central button. These tongues are bent downwardly so as to clamp the retaining member in position and the conduit rests thereon with its threaded sides or end in engagement with the springs which are in this instance staggered as in the other figures of the drawing. A suitable central aperture 43 is formed in the supporting structure of the limiting member 39 for the passage of the conductors. With this type of structure a solid front is presented until it is desired to enter the conduit into the box, when as above stated, the central button and springs may be displaced with a few blows from a hammer. In Fig. 17 I have illustrated additional springs 44 fitted to the bushing 39. These springs are each preferably provided at one end with a rectangular opening through which the lugs 41 are inserted so that the springs rest against the shoulders 40 and are in position to grasp the threads upon the pipe 38, as shown in Fig. 17.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described and ascertained the nature of my invention, what I claim as new and desire to secure by Letters-Patent is:

1. The combination of a support for an electric wire conduit having an aperture to receive the end of the conduit, leaf springs carried by the support at opposite sides of said aperture and disposed radially thereto and having inner concave free ends spaced apart a distance less than the diameter of the aperture to grip the end of a conduit inserted therethrough, and a stop member carried by the support beyond the springs and projecting across the aperture to limit the inward movement of the conduit through the same.

2. The combination of a support for an electric wire conduit having an aperture to receive the end of the conduit, leaf springs carried by the support at opposite sides of said aperture and disposed radially thereto and having inner concave free ends spaced apart a distance less than the diameter of the aperture to grip the end of a conduit inserted therethrough, and a detachable stop member carried by the support beyond the springs and projecting across the aperture to limit the inward movement of the conduit through the same.

3. The combination of a support for an electric wire conduit having an aperture to receive the end of the conduit and openings at opposite sides of said aperture, leaf springs carried by the support and having concave free ends spaced apart a distance less than the diameter of the aperture to grip the end of a conduit inserted therethrough, and a stop member projecting across the aperture to limit the inward movement of the conduit through the same and having spaced tongues adapted to pass through the openings in the support and engage the face of the support whereby to secure the stop member thereto.

In testimony whereof I have hereunto set my hand in presence of two subscribing witnesses.

OTTO M. NEITZEL.

Witnesses:
HOWARD MARSHALL,
EMMETT A. PEMBERTON.